United States Patent [19]

Kolitsch

[11] Patent Number: 4,601,198
[45] Date of Patent: Jul. 22, 1986

[54] TORSIONAL TEST STAND
[75] Inventor: Jörg Kolitsch, Munich, Fed. Rep. of Germany
[73] Assignee: Bayerische Motoren Werke Aktiengesellschaft, Fed. Rep. of Germany
[21] Appl. No.: 715,469
[22] Filed: Mar. 25, 1985
[30] Foreign Application Priority Data Mar. 23, 1984 [DE] Fed. Rep. of Germany ....... 3410702

[51] Int. Cl.$^4$ .......................................... G01M 15/00
[52] U.S. Cl. ..................................... 73/118; 73/162; 73/847
[58] Field of Search .............. 73/118, 847, 162, 862.9, 73/862.19

[56] References Cited

U.S. PATENT DOCUMENTS 2,157,903  5/1939  Lapsley .......................... 73/162 UX
2,712,756  7/1955  Greer et al. ...................... 73/162 X
4,501,139  2/1985  Petersen ............................ 73/118

FOREIGN PATENT DOCUMENTS 1573682   7/1975  Fed. Rep. of Germany .
2057872   6/1977  Fed. Rep. of Germany .
2908860  10/1980  Fed. Rep. of Germany .
3100848   1/1984  Fed. Rep. of Germany .
2948517   2/1984  Fed. Rep. of Germany .

Primary Examiner—Jerry W. Myracle
Attorney, Agent, or Firm—Craig & Burns

[57] ABSTRACT

A test stand for power-transmitting shafts having a test circuit consisting of two parallel test sections in which one shaft each is subjected to torque by a respective torquing clutch; the test stand is so constructed that the torques exerted by the two torquing clutches are identical and additional test loads can be produced by additional movements of one of the reversing gears completing the test circuit.

18 Claims, 5 Drawing Figures

TORSIONAL TEST STAND

The present invention relates to a torsional test stand for shafts with a test circuit closed by reversing gears and containing two parallel test sections, in which one shaft each is subjected to torsional stresses by a torquing clutch with a torque superimposed on a rotary movement, and with an arrangement for an additional test load of the shaft end.

Such a test stand is disclosed in the DE-PS 20 57 872. The test specimen or specimens are thereby intended to be twisted or torqued within a test section with the overall torque about an angle corresponding in dependence on the elasticity of the test sample of a test section to the elasticity of all installed test specimens. Consequently, a relationship exists between the elasticities of all test pieces. This presupposes that the same are mechanically coupled with each other so that the mass decisive for the determination of the natural frequency of the test stand is relatively high and therewith this frequency is relatively low. Therebeyond considerable difficulties arise with the evaluation of the results obtained with the test stand. If the torque acting on each test piece is equal to the overall torque then, in addition to the torque in the test section of the test piece, also the torque of the other test section has to be taken into consideration. If, in contrast thereto, the twisting or torque angle is independent of the overall torque, then in addition to the elasticity of the test piece, also the elasticity of all other test pieces has to be taken into consideration.

In the prior art torsional test stand the additional test loads are produced with the aid of a guide section which are arranged between two test pieces in a test section and are moved by additional drives. This leads to a considerable length of the test section and to a further lowering of the natural frequency of the test stand by reason of the several test specimens arranged in this test section.

The present invention is concerned with the task to provide a test stand of the type described hereinabove which is characterized by a simple construction and therebeyond possesses a high natural frequency.

The underlying problems are solved according to the present invention in that the torques produced in the test sections are oppositely equal and in that the test loads are produced by means of one reversing gear which is movably supported at a predetermined distance from the other reversing gear.

The alternate effects between the two test sections respectively between the test specimens arranged therein are completely eliminated by the equality of the torques in the two test sections. As a result thereof, the mass decisive for the natural frequency is reduced. If in addition thereto, only one test specimen or test piece is arranged in each test section, then the natural frequency of the test stand is essentially equal to that of the shafts. Test conditions result therefrom which correspond nearly exactly to the actual operation. The production of the additional test load with the aid of one of the two reversing gears itself permits to dispense with guide sections or the like and thus leads directly to a particularly simple construction and a short structural length of the entire test stand.

The additional test loads can be produced in different ways. It is particularly advantageous to displace the one reversing gear at the predetermined distance from the other reversing gear and/or to pivot the same about a vertical axis. An unequivocal relationship between the adjusting path respectively adjusting angle and the corresponding test load results therefrom. Also the superimposition of the two types of loads leads to unequivocal and reproducible test results.

The movement of the reversing gear can be realized with constructively simple means if the reversing gear is held pivotally in a parallel frame which is retained in a vertically acting movement arrangement.

Load conditions may also be realized with the aid of the parallel frame as occur in shafts for so-called inclined guide axles. For that purpose it is only necessary to align the parallel frame obliquely to the shaft. Shafts of different length can also be examined with the aid of the test stand in accordance with the present invention. For that purpose it is only necessary to adjust the distance between the two reversing gears corresponding to the length of the shaft to be examined. This can take place, for example, in that the structural unit consisting of the reversing gear not subjected to any vertical respectively pivot movement and of the two torquing clutches is adjustable in its distance to the other reversing gear.

Shafts which are made of two parts and include a joint along their length may also be tested with the test equipment of the present invention. To use of an intermediate stand is advantageous for that purpose which supports the shafts within the area of the intermediate joint. The shafts are then protected against a buckling area of the intermediate bearing.

Finally, the reversing gear itself may be so constructed that it does not transmit any resulting torque outside of its housing. For that purpose three gears are provided, of which the two outer gears are operatively connected with one of the test specimens each and the center gear force-lockingly connects these two gears with each other. Such a type of construction of a reversing gear is disclosed in a structural form integrated with a torquing clutch from the publication ATZ, publication 1963, 1961, Vol. 8, pages 239-242.

These and other objects, features and advantages of the present invention will become more apparent from the following description when taken in connection with the accompanying drawing which shows, for purposes of illustration only, several embodiments in accordance with the present invention, and wherein.

Figure 1:
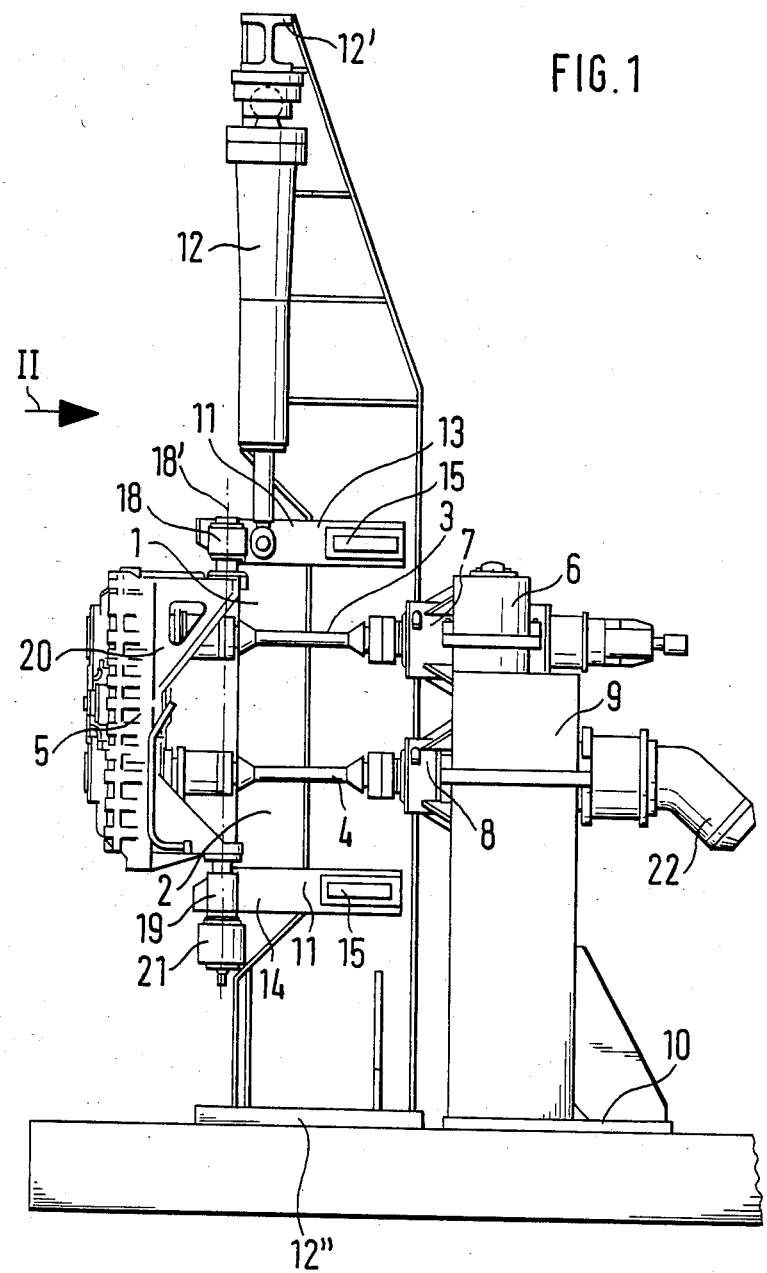
FIG. 1 is a side elevational view of a test stand for output shafts in accordance with the present invention.
Figure 2:
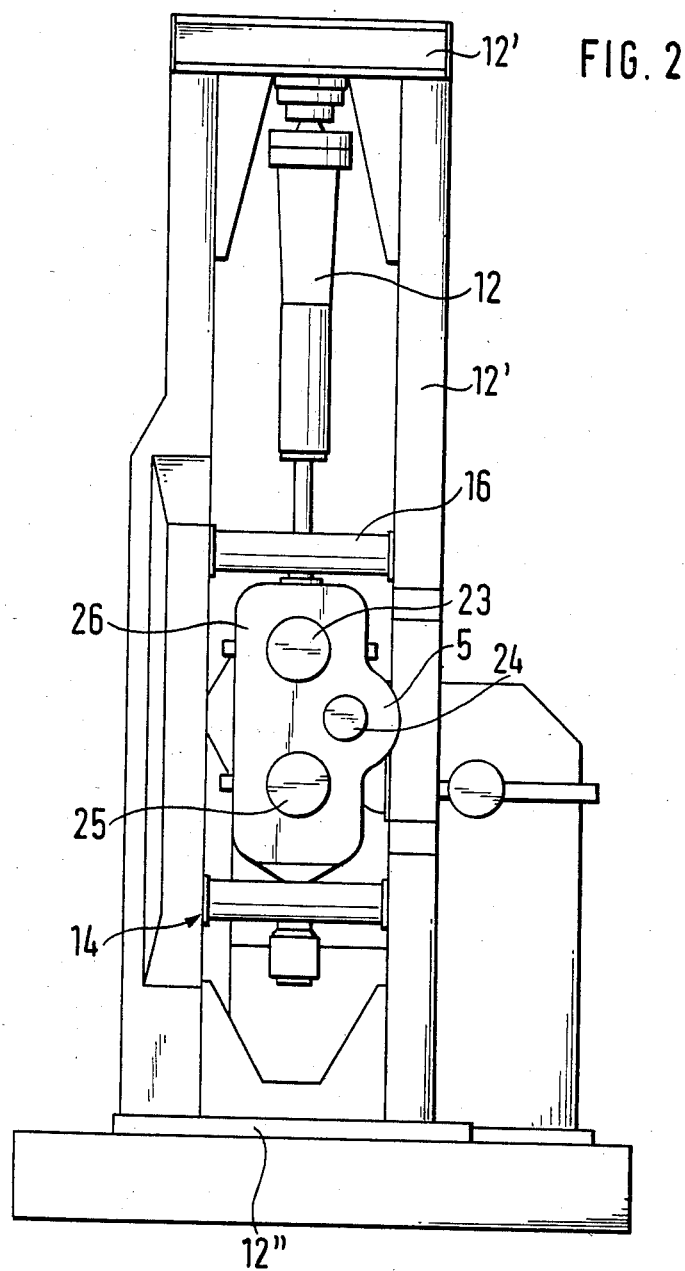
FIG. 2 is a front elevational view of the test stand of FIG. 1.
Figure 3:
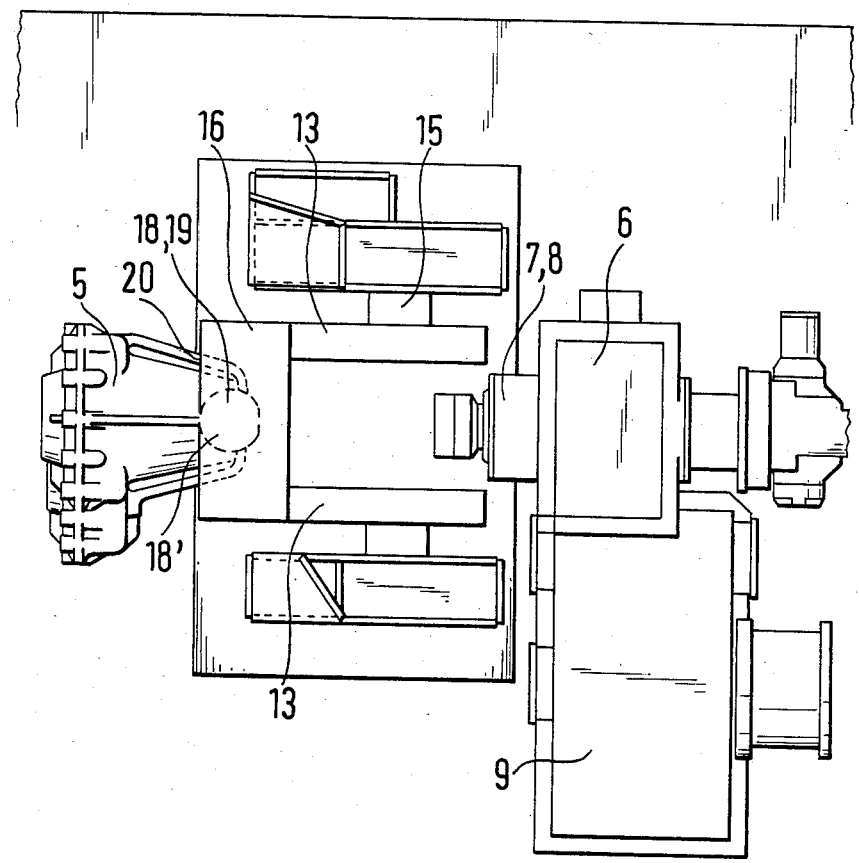
FIG. 3 is a top plan view on the test stand of FIG. 1.

Referring now to the drawing wherein like reference numerals are used throughout the various views to designate like parts, the test stand illustrated in FIGS. 1-3 includes within a closed test circuit two parallel test sections 1 and 2, in which is located one test piece or test specimen each in the form of an output shaft 3 and 4. Reversing gears 5 and 6 are located at both ends of the test sections 1 and 2. Furthermore, torquing clutches 7 and 8 are arranged between the reversing gear 6 and the output shafts 3 and 4.

The structural unit 9 containing the reversing gear 6 and the torquing clutches 7 and 8 is seated on a baseplate 10 whereas the reversing gear 5 is held in a parallel frame 11. The parallel frame 11 is secured at a displacement cylinder 12 which in its turn is retained at an overhead frame 12' with a baseplate 12''.

The parallel frame 11 includes two U-shaped frame parts 13 (FIG. 3) and 14 (FIG. 2) whose legs are rotatably retained in bearings 15. Pivot bearings 18 and 19 are located in the base body 16 of the frame part 13 and correspondingly in the illustrated base body of the frame part 14, which receive a support 20 for the reversing gear 5. A rotary cylinder 21 is located underneath the rotary bearing 19, by means of which the support 20 together with the reversing gear 5 can be pivoted about an axis 18' (FIG. 1), which extends through the pivot bearings 18 and 19.

For testing the output shafts 3 and 4 about their torsional strength, the latter are subjected to a torque with the aid of the torquing clutches 7 and 8. The torques of the two torquing clutches 7 and 8 are identical. A dependency of the elasticities of the output shafts 3 and 4 does not exist. The twisting angle, through which each output shaft is rotated by reason of effective torque, depends solely on the torque applied by the respective torquing clutch and the elasticity of the output shaft itself. The natural frequency of the test stand is high and is determined essentially only by the natural frequency of the output shafts themselves because elastic dependencies between the test sections 1 and 2 do not exist. This is true independently of the rotational speed, with which the output shafts are driven with the aid of a driving motor 22 which is also a component of the structural unit 9.

The front view of FIG. 2 illustrates essentially the construction of the reversing gear 5. It essentially consists of three gears 23 to 25 of which the gears 23 and 25 are each connected with one of the output shafts 3 and 4, respectively and the center gear 24 is supported inside of the gear housing 26. The torque which is transmitted outside of the transmission housing is always zero with this type of construction of the transmission because the torques produced by the torquing clutches compensate with the aid of the gear 24.

The plan view of the test stand of FIG. 1, as illustrated in FIG. 3, shows the spatial arrangement of the support 20 for the reversing gear 5 as well as the construction of the structual unit 9 with the torquing clutches 7 and 8 and the reversing gear 6.

Additional test loads for the output shafts 3 and 4 which are matched to the load conditions of the output shafts 3 and 4 in practice and which may also possess, for example, a nonlinear configuration, are produced with the aid of the displacement cylinder 12 and of the rotary cylinder 21. It becomes possible therewith with a test stand whose natural frequency is nearly identical to the natural frequency of the test pieces (3 and 4), to undertake in addition to the load by the torque, additional loads true to practice by vertical and pivot movements of the shaft end located at the reversing gear 5. These additional loads are introduced directly into the test samples 3 and 4 by the reversing gear 5.

Figure 4:
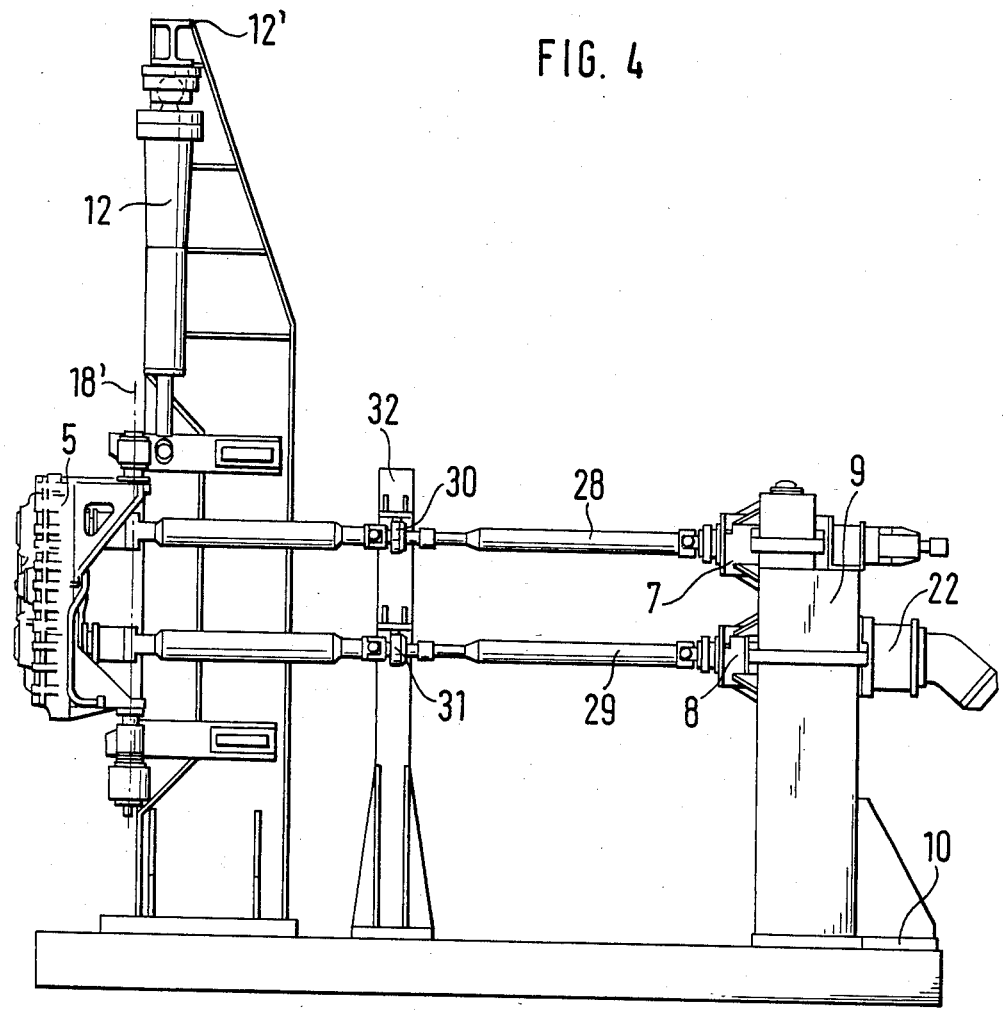
FIG. 4 is a side elevational view, corresponding to FIG. 1, of a modified embodiment of a test stand in accordance with the present invention for universal joint shafts.

The test stand of FIG. 4 serves for the testing of universal joint shafts. For that purpose the structural unit 9 is adjustable in its distance from the reversing gear 5 corresponding to the length of the universal joint shafts 28 and 29 to be tested. A stationary intermediate stand 32 is located within the area of the intermediate joint 30 and 31 of the joint-shafts 28 and 29, which supports the universal joint shafts 28 and 29. Also in this embodiment any elastic dependency is precluded between the two test sections 1 and 2 and thus the natural frequency of the test stand is determined essentially by the natural frequency of the two test pieces.

Figure 5:
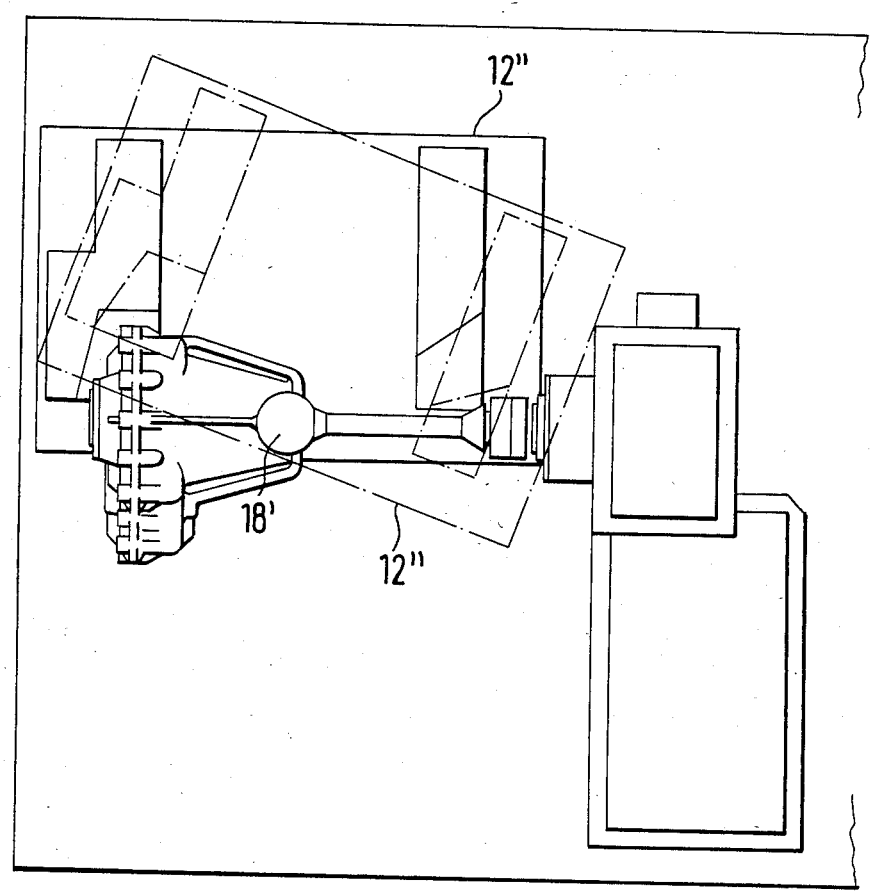
FIG. 5 is a top plan view of a corresponding test stand for output shafts for cross guide and inclined guide axles in accordance with the present invention.

FIG. 5 finally illustrates a test stand which can be used for output shafts in inclined guide axles or transverse guide axles. Differing from the test stand of FIG. 1, the parallel frame is adapted to be aligned obliquely or transversely to the output shafts 3 and 4. This is achieved by pivoting the structural unit consisting of the baseplate 12'' and of the overhead frame 12' about the end point of the output shafts 3 and 4, i.e. about the axis 18'. The arrangement for the transverse guide axles is indicated in full lines while the arrangement for inclined guide axles is indicated in dash and dotted lines. The reversing gear 5 thereby remains unchanged in its position in the absence of the additional test loads produced by the displacement cylinder 12 respectively the rotary cylinder 15.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A torquing test stand for shafts, comprising test circuit means including two parallel test sections for shafts to be tested and closed by reversing gear means for applying opposite torques to said shafts, torquing clutch means for each test section, a respective shaft being subjected to a torque superimposed on a rotary movement by the torquing clutch means, and further means for producing an additional test load of a respective shaft end, the torques produced in the test sections being substantially equal and the test loads being produced by means of one of said reversing gear means which is movably supported at a predetermined distance from the other reversing gear means.

2. A torquing test stand according to claim 1, wherein the one reversing gear means is displaceable substantially vertically at said distance.

3. A torquing test stand according to claim 2, wherein said one reversing gear means is pivotal about a vertical axis at said distance.

4. A torquing test stand according to claim 3, wherein the one reversing gear means is pivotally supported in a parallel frame means which is movable in the direction of the vertical axis.

5. A torquing test stand according to claim 4, wherein said parallel frame means is operable to be aligned in a predetermined direction.

6. A torquing test stand according to claim 5, wherein said direction is oblique to the shafts.

7. A torquing test stand according to claim 5, wherein said direction is transverse to the shafts.

8. A torquing test stand according to claim 4, wherein the reversing gear means includes three gears, of which the two outer gears are connected with the two shafts and the center gear establishes a force-locking connection of the outer gears.

9. A torquing test stand according to claim 8, wherein the other reversing gear means is changeable in its distance from the one reversing gear means.

10. A torquing test stand according to claim 9, further comprising a stationary intermediate stand between the reversing gear means on which are supported jointed shafts to be tested at the height of their intermediate joint.

11. A torquing test stand according to claim 1, wherein said one reversing gear means is pivotal about a vertical axis at said distance.

12. A torquing test stand according to claim 1, wherein the one reversing gear means is pivotally supported in a parallel frame means which is movable in the direction of the vertical axis.

13. A torquing test stand according to claim 12, wherein said parallel frame means is operable to be aligned in a predetermined direction.

14. A torquing test stand according to claim 13, wherein said direction is oblique to the shafts.

15. A torquing test stand according to claim 13, wherein said direction is transverse to the shafts.

16. A torquing test stand according to claim 1, wherein the reversing gear means includes three gears, of which the two outer gears are connected with the two shafts and the center gear establishes a force-locking connection of the outer gears.

17. A torquing test stand according to claim 1, wherein the other reversing gear means is changeable in its distance from the one reversing gear means.

18. A torquing test stand according to claim 1, further comprising a stationary intermediate stand between the reversing gear means on which are supported jointed shafts to be tested at the height of their intermediate joint.

* * * * *